United States Patent

[11] 3,581,645

[72] Inventors Kunihiko Hori
Kawasaki-shi, Kanagawa-ken;
Yutaka Saito, Tokyo, both of, Japan
[21] Appl. No. 764,137
[22] Filed Oct. 1, 1968
[45] Patented June 1, 1971
[73] Assignee Nippon Kogaku K.K.
Tokyo, Japan
[32] Priority Oct. 11, 1967
[33] Japan
[31] 42/65066

[54] MACROPHOTOGRAPHIC ATTACHMENT WITH VERTICAL OPTICAL AXIS
3 Claims, 3 Drawing Figs.
[52] U.S. Cl. .................................................. 95/45,
95/33, 95/39
[51] Int. Cl. .................................................. G03b 3/06
[50] Field of Search ........................................ 355/65;
95/12.5, 39, 45, 33

[56] References Cited
UNITED STATES PATENTS
2,397,031 3/1946 Merritt et al. .................. 95/12.5
2,487,671 11/1949 Pratt et al. ..................... 355/65

*Primary Examiner*—Samuel S. Matthews
*Assistant Examiner*—T. A. Mawe
*Attorney*—Anton J. Wille ABSTRACT: A macrophotographic device is provided for a single lens reflex camera provided with interchangeable lenses in the form of an adapter for taking closeup photographs at various magnifications. Two fixed reflecting surfaces at right angles to each other and two reflecting mirrors at right angles to each other and movable in unison, are provided in the light path between the objective and the film for increasing or decreasing the optical path without changing the distance between the objective and the film.

Patented June 1, 1971
3,581,645
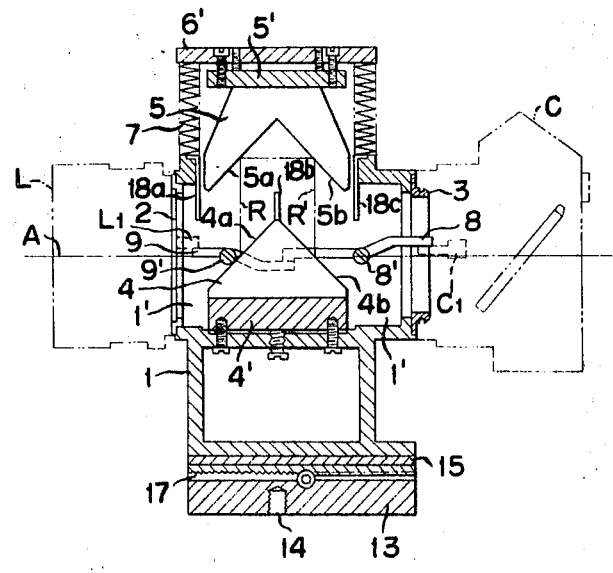
FIG. 1
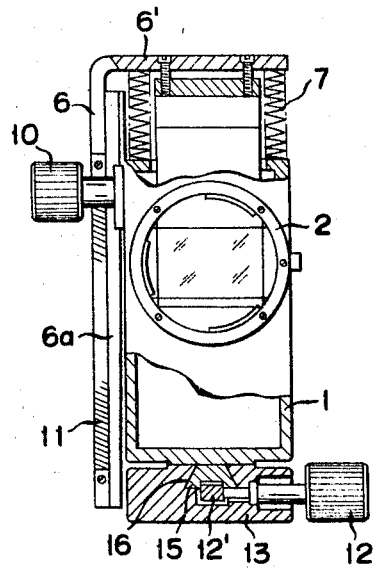
FIG. 2
FIG. 3

MACROPHOTOGRAPHIC ATTACHMENT WITH VERTICAL OPTICAL AXIS

This invention relates to the small and light weight macrophotographing device capable of remarkably high magnification in closeup photography by using a reflecting mirror between the camera lens mount and camera fitting mount provided on the body of the device to change the light path and to lengthen the light path.

In the conventional closeup photography using a single lens reflex camera at relatively high magnification as far as several times, bellows focusing attachment capable of changing magnification continuously, has been used, however, when bellows focusing attachment is used to carry out enlarging photography of higher magnification, it is necessary to join a number of other extension rings and it becomes too long, and the precision of photography becomes poor, and a blurred picture resulted from camera jarring and vibration is frequently occurred. The conventional bellows focusing attachment has such a drawback that the extension and contraction distance between the lens and the body is great, and the interlocking between the shutter and the diaphragm cannot be easily attained, and therefore it is impossible to make the diaphragm of the camera lens into perfectly automatic diaphragm, and the stopping operation is troublesome.

This invention has no such drawbacks as given above and, the object of this invention is to provide a device which is small and light weight but can perform perfectly automatic stopping operation and carry out the enlarging photography as far as ten and several times magnification which could not be attained till now by the method of changing the light path.

In accordance with the device of this invention, the light path is changed by using a reflecting mirror to lengthen the light path, and therefore the closeup photography of high magnification which cannot be attained by the conventional bellows focusing attachment, can be made by means of very small and light device. In carrying out the closeup photography of high magnification, when the distance between the lens and the object is changed, the distance between the lens and the film must be greatly changed in proportion to the square of the magnification on that occasion, but when the device of this invention is employed, the light path is changed and has a going path and a returning path, and therefore the amount of the extension or contraction of the portion of the bellows can be reduced by half, and therefore it is very efficient in carrying out closeup photography. In addition to that, the distance between the camera and the lens is constant, and therefore it is possible to attain the perfect automatic stopping by a lever, and therefore it becomes very convenient. When compared with the conventional bellows focusing attachment, the device of this invention is very small and light, and therefore the device of this invention is excellent in view of the prevention of a blurred picture resulted from the jarring and vibration of the camera, which is important factor in closeup photography, and at the same time the device of this invention is convenient in the portability. When the device of this invention is employed, the camera and the lens can be provided closer, and the operation knob can be provided close to the camera, and therefore when closeup photography is carried out, it is easy to carry out the hand-operation and this device is also convenient when the light path is desired to be lengthened more by connecting several of the devices.

This invention is a macrophotographing device wherein a fixed reflecting mirror whose reflecting surfaces are at right angles to each other are fixed between the camera lens mount and the camera fitting mount provided on the body of the device, two reflecting surfaces of the moving reflecting mirror are provided in parallel face to face respectively with the two reflecting surface for changing the light path of the said fixed reflecting mirror, the moving reflecting mirror is provided to be movable in parallel along the changed direction of the photographing light path of said fixed reflecting mirror, and flexible member for intercepting the light are provided light tight between the body of the device and the supporting base for supporting and moving the moving mirror so as to enclose the said moving reflecting mirror therein.

This invention will be described more clearly referring to the illustrative embodiments shown in the attached drawings, in which:

FIG. 1 is the vertical cross-sectional view of an embodiment of this invention;

FIG. 2 is the front view thereof showing a partially cross section;

FIG. 3 is the ground plan thereof showing a partial cross section.

Referring to FIG. 1, FIG. 2 and FIG. 3, 1 is a body of a macrophotographing device; 2 is a lens fitting mount for fitting the camera lens L and is fixed at the front portion of the cavity 1 of the body 1 of the macrophotographing device; 3 is a camera fitting mount for fitting the camera C fixed coaxially with the lens fitting mount behind the cavity 1'; 4 is a fixed reflecting mirror provided within the cavity 1', and the reflecting surfaces 4a and 4b are at right angles to each other, and are fixed on the body 1 of the device through the adjustable supporting base 4' at the inclination of about 45° to the light axis A of the camera lens L respectively; 5 is a moving reflecting mirror, and the reflecting surface 5a and 5b are respectively rectangularly crossed, and at the same time the reflecting surfaces 5a and 5b are provided in parallel face to face with the surfaces 4a and 4b of the fixed reflecting mirror respectively. 6 is a supporting arm which is bent at the upper portion 6' thereof rectangularly to support the fitting base 5' and the bellows 7 for intercepting light is provided light tight between the body 1 of the device and the bent portion 6' of the bent arm 6 so as to surround the moving reflecting mirror; A dove tail 6a is provided on the supporting arm 6, and the projected dove tail 6a is movably fitted to the dove tail groove 1a which is provided on the side of the body 1 of the device so as to be in parallel with the reflected light path R whose direction is rectangularly changed against the direction of the camera lens light path A(see FIG. 3); 8 and 9 are the automatic diaphragm connecting lever for connecting the lever $L_1$ for opening and closing the diaphragm of the lens and the lever $C_1$ for controlling the automatic diaphragm of the camera, and are respectively pivoted (8'), (9') on the internal wall of the camera body 1, and the lever $L_1$ is moved along with the movement of the lever $C_1$, to change the aperture of the diaphragm; 10 is the up and down moving knob supported rotatably on the side of the body of the device, and has the pinion 10' which is meshed in the rack 11 provided on the side surface of the supporting arm 6, and 12 is the back and forth moving knob for moving the body 1 in the direction of the light axis A of the lens, and is rotatably supported on the tripod fitting base 13, and pinion 12' is provided on the end thereof, the tripod fitting base 13 has the screw hole 14 for screwing up the screw member (not shown) for fitting the tripod, and the dovetail groove 16 to be movably inserted into the dovetail 15 fixed on the lower surface of the body 1 of the device. The dovetail 15 is provided in parallel with the light axis A of the camera lens, and at the lower surface of the dovetail 15, the rack 17 which is meshed in the pinion 12' is provided; 18a, 18b, and 18c are the light intercepting plates provided on the body 1 of the device in order to prevent the incident light from the camera lens from directly passing into the camera body C.

The following is an explanation about the effect thereof. The reflecting surfaces 4a and 4b of the fixed reflecting mirror 4, and the reflecting surfaces 5a and 5b of the moving reflecting mirror 5 are at right angles to each other, and at the same time, the surfaces 4a and 5a, and the surfaces 4b and 5b form parallel plane, and therefore the going path R and the returning path R' between the fixed reflecting mirror 4 for reflecting the photographing light path A to change the direction thereof and the moving reflecting mirror 5 can become parallel light paths. When the up and down moving knob 10 is rotated, the supporting arm 6 is moved parallelly along the reflected light paths R, R' on the dovetail groove 1a provided on the side of the body 1 of the device by means of the pinion 10' and the rack 11, and therefore, the moving reflecting mirror 5 can be moved parallelly along the reflected light paths. Therefore, when the up and down moving knob 10 is rotated, it is possible to extend or contract the length of the light path twice as much as the amount of the movement of the moving reflecting mirror 5 without changing the photographing light axis between the lens fitting mount 2 and the camera fitting mount 3, and without changing the relative positions of the lens and the camera at all. Therefore, when the up and down moving knob is slightly rotated, it is possible not only to adjust the large photographing magnification and the focusing but also the flexible bellows can be extended or contracted slightly, and as is shown in the attached diagrams, when the lever $C_1$ for controlling automatic diaphragm on the side of the camera C is moved up and down the movement is transmitted to the lever $L_1$ for opening and closing the diaphragm on the side of the lens through the levers 8 and 9, and the aperture of the diaphragm can be changed by the movement of the lever $L_1$. In this case, the distance between the camera fitting mount 3 and the lens fitting mount 2, cannot be changed even by the adjustment of the photographing magnification and focusing and is short, and therefore the automatic stopping synchronous mechanism interlocked to the lens from the camera side is possible to perform the function thereof satisfactorily even if the very simple device of the conventional intermediate ring type should be employed.

In the above given embodiment, the reflecting surface of the reflecting mirror is a surface reflection, but total reflection can be made on the reflecting surface of a prism. When the length of the light path is lengthened more, more than two of the device of this invention can be connected back and forth.

What we claim is:

1. A macrophotographing adapter for a camera of interchangeable objective type, comprising:
    a mirror housing having a first mount for an objective to be mounted thereon and a second mount adapted to be fixed to the camera body, the light from an object passing through the mirror housing into the camera body,
    a mirror supporting member slidably mounted on said mirror housing for movement in a perpendicular direction to the optical axis of the objective,
    reflecting means in the path of light passing between the object and the camera body consisting of first and second reflecting members,
    said first reflecting member having first and fourth reflecting surfaces and being fixed on said mirror housing,
    and said second reflecting member having second and third reflecting surfaces and mounted on said supporting member,
    said second and third reflecting surfaces being spaced from the optical axis of the objective and in substantially opposite alignment with said first and fourth reflecting surfaces,
    said first reflecting surface lying in the path of light passing through the objective and said first mount,
    said second reflecting surface lying in the path of light reflected from said first reflecting surface perpendicular to the optical axis of the objective,
    said third reflecting surface lying in the path of light reflected from said second reflecting surface parallel to the optical axis of the objective, and
    said fourth reflecting surface lying in the path of light reflected from said third reflecting surface parallel to the path of light directed by said first reflecting surface and reflecting light from said third reflecting surface to said second mount,
    and a magnification adjusting mechanism including a manualy operable member for movement of said mirror supporting member whereby said second reflecting member is moved in the direction of the path light from said first and third reflecting surfaces.

2. A macrophotographing adapter according to claim 1, wherein said mirror housing has an opening through which said second reflecting member is projected into said mirror housing and a bellows provided between said supporting member and said opening.

3. A macrophotographing adapter according to claim 1, further comprising:
    means for adjusting the focused distance between the subject and the objective including a securable base plate slidably carrying said mirror housing, and
    a manually operable member for movement of said mirror housing in parallel to the optical axis of the objective.